US008562900B2

(12) United States Patent
Alary et al.

(10) Patent No.: US 8,562,900 B2
(45) Date of Patent: Oct. 22, 2013

(54) METHOD OF MANUFACTURING AND USING ROD-SHAPED PROPPANTS AND ANTI-FLOWBACK ADDITIVES

(75) Inventors: Jean Andre Alary, Lille sur la Sorgue (FR); Thomas Parias, Croissy sur Seine (FR)

(73) Assignee: Imerys, Paris (FR)

( * ) Notice: Subject to any disclaimer, the term of this patent is extended or adjusted under 35 U.S.C. 154(b) by 309 days.

(21) Appl. No.: 11/624,057

(22) Filed: Jan. 17, 2007

(65) Prior Publication Data
US 2008/0053657 A1 Mar. 6, 2008

(51) Int. Cl.
B28B 3/20 (2006.01)
(52) U.S. Cl.
USPC .......................... 264/638; 264/660
(58) Field of Classification Search
USPC .................................. 264/638, 681
See application file for complete search history.

(56) References Cited

U.S. PATENT DOCUMENTS

| | | | |
|---|---|---|---|
| 1,871,792 A | 8/1932 | Horsfield | |
| 1,871,793 A | 8/1932 | Horsfield | |
| 1,942,431 A | 1/1934 | Jung | |
| 2,261,639 A | 11/1941 | Benner et al. | |
| 2,340,194 A | 1/1944 | McMullen | |
| 2,566,117 A | 8/1951 | Christie, Jr. et al. | |
| 2,699,212 A | 1/1955 | Dismukes | |
| 2,950,247 A | 8/1960 | McGuire, Jr. et al. | |
| 2,986,455 A | 5/1961 | Sandmeyer | |
| 3,026,938 A | 3/1962 | Huitt et al. | |
| 3,075,581 A | 1/1963 | Kern | |
| 3,079,243 A | 2/1963 | Ueltz | |
| 3,126,056 A | 3/1964 | Harrell | |
| 3,241,613 A | 3/1966 | Kern et al. | |
| 3,242,032 A | 3/1966 | Schott | |
| 3,245,866 A | 4/1966 | Schott | |
| 3,347,798 A | 10/1967 | Baer et al. | |
| 3,350,482 A | 10/1967 | Bowers | |
| 3,399,727 A | 9/1968 | Graham et al. | |
| 3,437,148 A | 4/1969 | Colpoys, Jr. | |
| 3,486,706 A | 12/1969 | Weyand | |
| 3,491,492 A | 1/1970 | Ueltz | |
| 3,497,008 A | 2/1970 | Graham et al. | |
| 3,598,373 A | 8/1971 | Inman | |
| 3,690,622 A | 9/1972 | Brunner et al. | |
| 3,758,318 A | 9/1973 | Farris et al. | |
| 3,810,768 A | 5/1974 | Parsons et al. | |
| 3,856,441 A | 12/1974 | Suzukawa et al. | |
| 3,890,072 A | 6/1975 | Barks | |
| 3,976,138 A | 8/1976 | Colpoys, Jr. et al. | |
| 4,008,763 A | 2/1977 | Lowe, Jr. | |
| 4,051,603 A | 10/1977 | Kern, Jr. | |
| 4,052,794 A | 10/1977 | Ganiaris | |
| 4,053,375 A | 10/1977 | Roberts et al. | |
| 4,068,718 A | 1/1978 | Cooke, Jr. et al. | |
| 4,072,193 A | 2/1978 | Sarda et al. | |
| 4,077,908 A | 3/1978 | Stenzel et al. | |
| 4,104,342 A | 8/1978 | Wessel et al. | |
| 4,111,713 A | 9/1978 | Beck | |
| 4,140,773 A | 2/1979 | Stowell et al. | |
| 4,252,544 A | 2/1981 | Takahashi | |
| 4,268,311 A | 5/1981 | VerDow | |
| 4,296,051 A | 10/1981 | Shimamura et al. | |
| 4,303,204 A | 12/1981 | Weston | |
| 4,343,751 A | 8/1982 | Kumar | |
| 4,371,481 A | 2/1983 | Pollock | |
| 4,392,988 A | 7/1983 | Dobson et al. | |
| 4,396,595 A | 8/1983 | Heytmeijer et al. | |
| 4,407,967 A | 10/1983 | Luks | |
| 4,427,068 A | 1/1984 | Fitzgibbon | |
| 4,439,489 A | 3/1984 | Johnson et al. | |
| 4,440,866 A | 4/1984 | Lunghofer et al. | |
| 4,442,897 A | 4/1984 | Crowell | |
| 4,450,184 A | 5/1984 | Longo et al. | |
| 4,462,466 A | 7/1984 | Kachnik | |

(Continued)

FOREIGN PATENT DOCUMENTS

| | | |
|---|---|---|
| AU | 551409 | 1/1983 |
| BR | 9501450 A | 8/1997 |
| BR | 9501449 C1 | 12/2000 |
| BR | 0303442 A | 5/2005 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |

(Continued)

OTHER PUBLICATIONS

Bagley, R. D., Cutler, I. B. and Johnson, D. L. (1970), Effect of TiO2 on Initial Sintering of Al2O3. Journal of the American Ceramic Society, 53: 136-141. doi: 10.1111/j.1151-2916.1970.tb12055.x.*
Hamano, K. Effects of TIO2 on Sintering of Alumina Ceramics . J.Ceram.Soc.Jap. J. Ceram. Soc. Jap. vol. 94, No. 5, pp. 505. 1986.*
Cutler, I. B., Bradshaw, C., Christensen, C. J. and Hyatt, E. P. (1957), Sintering of Alumina at Temperatures of 1400° C. and Below. Journal of the American Ceramic Society, 40: 134-139. doi: 10.1111/j.1151-2916.1957.tb12589.x.*

(Continued)

*Primary Examiner* — Joseph S Del Sole
*Assistant Examiner* — Russell Kemmerle, III
(74) *Attorney, Agent, or Firm* — Finnegan, Henderson, Farabow, Garrett & Dunner, L.L.P.

(57) ABSTRACT

A sintered rod-shaped proppant and anti-flowback agent possesses high strength and high conductivity. The sintered rods comprise between about 0.2% by weight and about 4% by weight aluminum titanate. In some embodiments, the sintered rods are made by mixing bauxitic and non-bauxitic sources of alumina that may also contain several so-called impurities (such as $TiO_2$), extruding the mixture, and sintering it. The starting material may optionally be milled to achieve better compacity and crush resistance in the final sintered rod. A fracturing fluid may comprise the sintered rods alone or in combination with a proppant, preferably a proppant of a different shape.

19 Claims, No Drawings

(56) References Cited

U.S. PATENT DOCUMENTS

| | | |
|---|---|---|
| 4,493,875 A | 1/1985 | Beck et al. |
| 4,509,598 A | 4/1985 | Earl et al. |
| 4,521,475 A | 6/1985 | Riccio et al. |
| 4,522,731 A | 6/1985 | Lunghofer |
| 4,547,468 A | 10/1985 | Jones et al. |
| 4,555,493 A | 11/1985 | Watson et al. |
| 4,607,697 A | 8/1986 | Urffer |
| 4,618,504 A | 10/1986 | Bosna et al. |
| 4,623,630 A | 11/1986 | Fitzgibbon |
| 4,628,042 A | 12/1986 | Speronello |
| 4,632,876 A | 12/1986 | Laird et al. |
| 4,639,427 A | 1/1987 | Khaund |
| 4,652,411 A | 3/1987 | Swarr et al. |
| 4,654,266 A | 3/1987 | Kachnik |
| 4,657,754 A | 4/1987 | Bauer et al. |
| 4,658,899 A | 4/1987 | Fitzgibbon |
| 4,668,645 A | 5/1987 | Khaund |
| 4,671,909 A | 6/1987 | Torobin |
| 4,680,230 A | 7/1987 | Gibb et al. |
| 4,713,203 A | 12/1987 | Andrews |
| 4,714,623 A | 12/1987 | Riccio et al. |
| 4,744,831 A | 5/1988 | Beck |
| 4,867,931 A | 9/1989 | Cochran, Jr. |
| 4,869,960 A | 9/1989 | Gibb et al. |
| 4,874,726 A | 10/1989 | Kleeb et al. |
| 4,879,181 A | 11/1989 | Fitzgibbon |
| 4,892,147 A | 1/1990 | Jennings, Jr. et al. |
| 4,894,285 A | 1/1990 | Fitzgibbob |
| 4,911,987 A | 3/1990 | Sakata et al. |
| 4,921,820 A | 5/1990 | Rumpf et al. |
| 4,921,821 A | 5/1990 | Rumpf et al. |
| 4,923,714 A | 5/1990 | Gibb et al. |
| 4,944,905 A | 7/1990 | Gibb et al. |
| 4,977,116 A | 12/1990 | Rumpf et al. |
| 5,002,904 A | 3/1991 | Jain et al. |
| 5,030,603 A | 7/1991 | Rumpf et al. |
| 5,045,506 A | 9/1991 | Dube et al. |
| 5,120,455 A | 6/1992 | Lunghofer |
| 5,153,153 A | 10/1992 | Freudenberg et al. |
| 5,160,678 A | 11/1992 | Gravener et al. |
| 5,175,133 A | 12/1992 | Smith et al. |
| 5,182,051 A | 1/1993 | Bandy et al. |
| 5,188,175 A | 2/1993 | Sweet |
| 5,212,143 A | 5/1993 | Torobin |
| 5,225,123 A | 7/1993 | Torobin |
| 5,240,654 A | 8/1993 | Smith et al. |
| RE34,371 E | 9/1993 | Rumpf et al. |
| 5,243,190 A | 9/1993 | Bandy et al. |
| 5,304,226 A | 4/1994 | Hasegawa et al. |
| 5,330,005 A | 7/1994 | Card et al. |
| 5,358,047 A | 10/1994 | Himes et al. |
| 5,387,268 A | 2/1995 | Hiraiwa et al. |
| 5,396,805 A | 3/1995 | Surjaatmadja |
| 5,397,759 A | 3/1995 | Torobin |
| 5,420,174 A | 5/1995 | Dewprashad |
| 5,422,183 A | 6/1995 | Sinclair et al. |
| 5,439,055 A | 8/1995 | Card et al. |
| 5,501,274 A | 3/1996 | Nguyen et al. |
| 5,501,275 A | 3/1996 | Card et al. |
| 5,547,023 A | 8/1996 | McDaniel et al. |
| 5,582,249 A | 12/1996 | Caveny et al. |
| 5,582,250 A | 12/1996 | Constien |
| 5,597,784 A | 1/1997 | Sinclair et al. |
| 5,604,184 A | 2/1997 | Ellis et al. |
| 5,633,084 A | 5/1997 | Hiraiwa et al. |
| 5,697,440 A | 12/1997 | Weaver et al. |
| 5,699,860 A | 12/1997 | Grundmann |
| 5,775,425 A | 7/1998 | Weaver et al. |
| 5,782,300 A | 7/1998 | James et al. |
| 5,787,986 A | 8/1998 | Weaver et al. |
| 5,833,000 A | 11/1998 | Weaver et al. |
| 5,833,361 A | 11/1998 | Funk |
| 5,837,656 A | 11/1998 | Sinclair et al. |
| 5,839,510 A | 11/1998 | Weaver et al. |
| 5,853,048 A | 12/1998 | Weaver et al. |
| 5,871,049 A | 2/1999 | Weaver et al. |
| 5,893,935 A | 4/1999 | Wood |
| 5,948,734 A | 9/1999 | Sinclair et al. |
| 5,955,144 A | 9/1999 | Sinclair et al. |
| 5,964,291 A | 10/1999 | Bourne et al. |
| 5,972,835 A | 10/1999 | Gupta |
| RE36,466 E | 12/1999 | Nelson et al. |
| 6,015,442 A | 1/2000 | Alary |
| 6,032,741 A | 3/2000 | Johnson |
| 6,047,772 A | 4/2000 | Weaver et al. |
| 6,059,034 A | 5/2000 | Rickards et al. |
| 6,074,754 A | 6/2000 | Jacobsen et al. |
| 6,080,232 A | 6/2000 | Sperlich et al. |
| 6,152,227 A | 11/2000 | Lawson et al. |
| 6,172,011 B1 | 1/2001 | Card et al. |
| 6,192,985 B1 | 2/2001 | Hinkel et al. |
| 6,209,643 B1 | 4/2001 | Nguyen et al. |
| 6,217,646 B1 | 4/2001 | Gervais |
| 6,330,916 B1 | 12/2001 | Rickards et al. |
| 6,364,018 B1 | 4/2002 | Brannon et al. |
| 6,372,678 B1 | 4/2002 | Youngman et al. |
| 6,406,789 B1 | 6/2002 | McDaniel et al. |
| 6,419,019 B1 | 7/2002 | Palmer et al. |
| 6,503,676 B2 | 1/2003 | Yamashita et al. |
| 6,528,157 B1 | 3/2003 | Hussain et al. |
| 6,582,819 B2 | 6/2003 | McDaniel et al. |
| 6,599,863 B1 | 7/2003 | Palmer et al. |
| 6,613,114 B1 | 9/2003 | Alary |
| 6,632,527 B1 | 10/2003 | McDaniel et al. |
| 6,659,179 B2 | 12/2003 | Nguyen |
| 6,668,926 B2 | 12/2003 | Nguyen et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,729,404 B2 | 5/2004 | Nguyen et al. |
| 6,732,800 B2 | 5/2004 | Acock et al. |
| 6,743,269 B2 | 6/2004 | Meyer et al. |
| 6,749,025 B1 | 6/2004 | Brannon et al. |
| 6,752,208 B1 | 6/2004 | Nguyen |
| 6,753,299 B2 | 6/2004 | Lunghofer et al. |
| 6,772,838 B2 | 8/2004 | Dawson et al. |
| 6,780,804 B2 | 8/2004 | Webber et al. |
| 6,830,105 B2 | 12/2004 | Thesing |
| 6,832,652 B1 | 12/2004 | Dillenbeck et al. |
| 6,837,309 B2 | 1/2005 | Boney et al. |
| 6,866,099 B2 | 3/2005 | Nguyen |
| 6,887,811 B2 | 5/2005 | Kanbara et al. |
| 6,892,813 B2 | 5/2005 | Nguyen et al. |
| 6,949,491 B2 | 9/2005 | Cooke, Jr. |
| 6,962,200 B2 | 11/2005 | Nguyen et al. |
| 6,983,797 B2 | 1/2006 | Nguyen et al. |
| 7,004,255 B2 | 2/2006 | Boney |
| 7,032,664 B2 | 4/2006 | Lord et al. |
| 7,032,667 B2 | 4/2006 | Nguyen et al. |
| 7,036,591 B2 | 5/2006 | Cannan et al. |
| 7,036,592 B2 | 5/2006 | Nguyen et al. |
| 7,040,403 B2 | 5/2006 | Nguyen et al. |
| 7,044,220 B2 | 5/2006 | Nguyen et al. |
| 7,044,224 B2 | 5/2006 | Nguyen |
| 7,053,018 B2 | 5/2006 | Kanbara et al. |
| 7,063,150 B2 | 6/2006 | Slabaugh et al. |
| 7,066,258 B2 | 6/2006 | Justus et al. |
| 7,067,445 B2 | 6/2006 | Webber et al. |
| 7,080,688 B2 | 7/2006 | Todd et al. |
| 7,081,439 B2 | 7/2006 | Sullivan et al. |
| 7,082,993 B2 | 8/2006 | Ayoub et al. |
| 7,086,460 B2 | 8/2006 | Nguyen et al. |
| 7,119,039 B2 | 10/2006 | Krause et al. |
| 7,128,158 B2 | 10/2006 | Nguyen et al. |
| 7,160,844 B2 | 1/2007 | Urbanek |
| 2003/0029094 A1 | 2/2003 | Moeltgen et al. |
| 2003/0195121 A1 | 10/2003 | Fitzgerald |
| 2003/0196805 A1 | 10/2003 | Boney et al. |
| 2004/0040708 A1 | 3/2004 | Stephenson et al. |
| 2004/0129923 A1 | 7/2004 | Nguyen et al. |
| 2004/0162224 A1 | 8/2004 | Nguyen et al. |
| 2004/0200617 A1 | 10/2004 | Stephenson et al. |
| 2004/0224155 A1 | 11/2004 | Barron et al. |
| 2005/0019574 A1 | 1/2005 | McCrary |

(56) References Cited

U.S. PATENT DOCUMENTS

| | | |
|---|---|---|
| 2005/0028979 A1 | 2/2005 | Brannon et al. |
| 2005/0059555 A1 | 3/2005 | Dusterhoft et al. |
| 2005/0059558 A1 | 3/2005 | Blauch et al. |
| 2005/0096207 A1 | 5/2005 | Urbanek |
| 2005/0126780 A1 | 6/2005 | Todd et al. |
| 2005/0130848 A1 | 6/2005 | Todd et al. |
| 2005/0145385 A1 | 7/2005 | Nguyen |
| 2005/0160678 A1 | 7/2005 | Bourlier |
| 2005/0166803 A1 | 8/2005 | Dillenbeck et al. |
| 2005/0173116 A1 | 8/2005 | Nguyen et al. |
| 2005/0194141 A1 | 9/2005 | Sinclair et al. |
| 2005/0244641 A1 | 11/2005 | Vincent |
| 2005/0274523 A1 | 12/2005 | Brannon et al. |
| 2005/0284630 A1 | 12/2005 | Nguyen et al. |
| 2005/0284631 A1 | 12/2005 | Nguyen et al. |
| 2006/0006589 A1 | 1/2006 | Canova et al. |
| 2006/0016598 A1 | 1/2006 | Urbanek |
| 2006/0035790 A1 | 2/2006 | Okell et al. |
| 2006/0048944 A1 | 3/2006 | van Batenburg et al. |
| 2006/0054324 A1 | 3/2006 | Sullivan et al. |
| 2006/0058173 A1 | 3/2006 | Mozhzherin et al. |
| 2006/0065398 A1 | 3/2006 | Brannon et al. |
| 2006/0073980 A1 | 4/2006 | Brannon et al. |
| 2006/0078682 A1 | 4/2006 | McDaniel et al. |
| 2006/0081371 A1 | 4/2006 | Duenckel et al. |
| 2006/0113078 A1 | 6/2006 | Nguyen et al. |
| 2006/0113080 A1 | 6/2006 | Nguyen et al. |
| 2006/0124303 A1 | 6/2006 | Nguyen et al. |
| 2006/0151170 A1 | 7/2006 | Brannon et al. |
| 2006/0157244 A1 | 7/2006 | Reddy et al. |
| 2006/0162926 A1 | 7/2006 | Roddy |
| 2006/0162929 A1 | 7/2006 | Urbanek |
| 2006/0166834 A1 | 7/2006 | Roddy |
| 2006/0174802 A1 | 8/2006 | Bedel et al. |
| 2006/0175058 A1 | 8/2006 | Nguyen |
| 2006/0201673 A1 | 9/2006 | Welton et al. |
| 2006/0219600 A1 | 10/2006 | Palamara et al. |
| 2006/0243441 A1 | 11/2006 | Cornelius de Grood et al. |
| 2006/0258546 A1 | 11/2006 | Brannon et al. |
| 2006/0272816 A1 | 12/2006 | Willberg et al. |
| 2007/0023187 A1 | 2/2007 | Canova et al. |
| 2007/0036977 A1 | 2/2007 | Sinclair et al. |

FOREIGN PATENT DOCUMENTS

| | | |
|---|---|---|
| DE | 2948584 | 6/1980 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| EP | 0 291 029 A1 | 11/1988 |
| EP | 0 360 404 A1 | 3/1990 |
| EP | 0 406 874 A1 | 1/1991 |
| EP | 1355038 | 10/2003 |
| GB | 284131 | 1/1928 |
| GB | 578424 | 6/1946 |
| GB | 715354 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| PH | 18450 | 7/1985 |
| RU | 2129987 | 5/1999 |
| RU | 2140874 | 11/1999 |
| RU | 2140875 | 11/1999 |
| RU | 99107936 | 1/2001 |
| RU | 2166079 | 4/2001 |
| RU | 2196889 | 1/2003 |
| RU | 2211198 | 8/2003 |
| RU | 2215712 | 11/2003 |
| RU | 2003100030/03 | 11/2003 |
| RU | 2002117351 | 1/2004 |
| WO | WO 92/09543 | 6/1992 |
| WO | WO 00/64573 | 11/2000 |
| WO | WO 0130699 | 5/2001 |
| WO | WO 2004/097171 | 1/2004 |
| WO | WO 2004/046495 | 6/2004 |
| WO | WO 2004/083600 | 9/2004 |
| WO | WO 2005/087665 | 9/2005 |
| WO | WO2005087665 A1 | 9/2005 |
| WO | WO 2005/100746 | 10/2005 |
| WO | WO2005100746 A1 | 10/2005 |
| WO | WO2005110942 A2 | 11/2005 |
| WO | WO 2006/082359 | 8/2006 |
| WO | WO 2006/082416 | 8/2006 |
| WO | WO 2006/084236 | 8/2006 |
| WO | WO2006135997 A1 | 12/2006 |

OTHER PUBLICATIONS

Rickards, Allan R. et al. BJ Services, Members of Society of Petroleum Engineers; *High Strength, Ultra-Lightweight Proppant Lends New Dimensions to Hydraulic Fracturing Application*, SPE 84308, pp. 1-14; 2003.

Chambers, R. et al., *Comparison of Fracture Geometries Utilizing Ultralightweight Proppants Provide Evidence That Partial Monolayers Can Be Created: A Case History*, SPE 96818; pp. 1-9; 2005.

Mendez, A.et al.; *A Quantum Leap in Horizontal Gravel Pack Technology;* SPE 94945; pp. 1-7; 2005.

Kendrick, D.E. et al., *Ultralightweight Proppants: A Field Study in the Big Sandy Field of Eastern Kentucky;* SPE 98006; pp. 1-7; 2005.

Rickards, Allan R. et al.; *High Strength, Ultra-Lightweight Proppant Lends New Dimensions to Hydraulic Fracturing Applications*; SPE 84308; pp. 1-14; 2003.

Letter dated Aug. 4, 1978 to B. Poplin from D. Golden, Coors Porcelain Company, with "Proposal to Supply Proppant," presented to Halliburton Services, issued Aug. 9, 1978.

Cutler, R.A. et al., TerraTek, Inc.; *Light Weight Proppants for Deep Gas Well Stimulation*, 2nd Annual Report, Jul. 1, 1980-Jun. 30, 1981, published Apr. 1982, DOE Contract AC19-79BC10038.

Jones, A. H. et al., TerraTek, Inc.; *Light Weight Proppants for Deep Gas Well Stimulation*, Jun. 1980, TR Report 80-47; DOE Contract AC19-79BC10038.

Neel, E.A. et al.; *Oxide Ceramic Proppants for Treatment of Deep Well Fractures*, SPE 6816, (1977).

UCAR Ceramic Props, *The Ideal Proppant for Deep Wells and High Compaction Pressures*.

DOE Progress Review No. 26 for reporting period Jan. 1-Mar. 31, 1981, Determine Feasibility of Fabricated Light Weight Proppants for Application in Gas and Oil Well Stimulation.

*Unimin Brochure*, Unimin Canada Ltd., Mar. 1991.

Johnson, S. M. et al., *Role of Impurities on Formation of Mulite from Kaolinite and $Al_2O_3SiO_2$ Mixtures*, Ceramic Bulletin, Vo. 61 No. 8 (1982), pp. 838-842.

*Determining Feasibility of Fabricating Light Weight Proppants for Application in Gas and Oil Well Stimulation*, Progress Report 2, DOE Contract DE-AC19-79BC10038, Submitted by Terra Tek, Inc., TR 79-77, Oct. 1979.

*Determining Feasibility of Fabricating Light Weight Proppants for Application in Gas and Oil Well Stimulation*, Progress Report 10, EOE Contract DE-AC19-79BC10038, Submitted by Terra Tek, Inc., TR 80-77, Jul. 1980.

Cutler, Raymond A., et al.; *New Proppants for Deep Gas Well Stimulation*, SPE 9869, 1977.

Sane, S.C. et al., *Effect of Grinding and Firing Treatment on the Crystalline and Glass Content and the Physical Properties of Whiteware Bodies*; 1951.

Lynch, E.D. et al., *Nepheline Syenite-Talc Mixtures as a Flux in Low-Temperature Vitrified Bodies*; 1950.

Lynch, J.F. et al., *Databook to Guide Materials Selection for Structural Applications*, Engineering Properties of Ceramics, TR 66-52, Jun. 1966.

(56) References Cited

OTHER PUBLICATIONS

West, Richard R. et al.; *Reactions in Silica-Alumina Mixtures*, Apr. 1958.
Mazdiyasni, K.S. et al.; *Synthesis and Mechanical Properties of Stoichiometric Aluminum Silicate (Mullite)*, Dec. 1972.
Cooke, Claude E., Society of Petroleum Engineers of AIME; *Hydraulic Fracturing with a high-Strength Proppant*, SPE 6213, 1976.
McDaniel, Robert R. et al., *The Effect of Various Proppants and Proppant Mixtures on Fracture Permeability*, SPE 7573, 1978.
Knibbs, D. Sc., N.V.S.; *The Industrial Uses of Bauxite*, 1928.
DOE Progress Review No. 21 for reporting period Oct. 1-Dec. 31, 1979, *Determining Feasibility of Fabricating Light Weight Proppants for Application in Gas and Oil Well Stimulation*.
DOE Progress Review No. 22 for reporting period Jan. 1-Mar. 31, 1980, *Determining Feasibility of Fabricating Light Weight Proppants for Application in Gas and Oil Well Stimulation*.
DOE Progress Review No. 23 for reporting period Apr. 1-Jun. 30, 1980, *Determining Feasibility of Fabricating Light Weight Proppants for application in Gas and Oil Well Stimulation*.
DOE Progress Review No. 24 for reporting period Jul. 1-Sep. 31, 1980, *Determining Feasibility of Fabricating Light Weight Proppants for Application in Gas and Oil Well Stimulation*.
DOE Progress Review No. 27 for reporting period Apr. 1-Jun. 30, 10981, *Determining Feasibility of Fabricating Light Weight Proppants for Application in Gas and Oil Well Stimulation*.
Document entitled Feb., Mar., Apr. 1998: *Commercial Activity*, with Exhibits A-D.
Document entitled Jul. 1998: *Commercial Activity*, with Exhibit E.
Document entitled Sep. 2001: *Commercial Activity*, with Exhibit F.
ScalePROP brochure, Schlumberger, Jan. 2002.
Santamarina, J.C. and Cho, G.C. (2004)I; *Soil behaviour. The role of particle shape*; pp. 1-14; Skempton Conf., March, London.
Armstrong, Kevin; Collins, Jim; Dumont, Gilbert; Slusher, Gary; *Advanced Fracturing Fluids Improve Well Economics; Oilfield Review*; Autumn 1995; pp. 34-51.
Olson, K; Haidar S.; Milton-Tayler, D.; Olsen E.; *Multiphase Non-Darcy Pressure Drop in Hydraulic Fracturing; Society of Petroleum Engineers*; SPE 90406; 27 pages.
U.S. Patent and Trademark Office, Office Action dated Nov. 14, 2007; U.S. Appl. No. 11/469,589; 20 total pages.
U.S. Appl. No. 11/469,589.
International Search Report for Application No. PCT/IB2007/003613 dated Apr. 24, 2008.
International Search Report for Application No. PCT/IB2007/003613 dated Jun. 30, 2008.
Final Office Action dated Jul. 3, 2008, for U.S. Appl. No. 11/469,589.
Advisory Action dated Aug. 1, 2008, for U.S. Appl. No. 11/469,589.
Brouwers, H. J. H., "Particle-size distribution and packing fraction of geometric random packings," Physical Review E 74, 031309, 2006, pp. 031309-1-14.
Office Action dated Dec. 19, 2008, for U.S. Appl. No. 11/469,589.
Office Action dated Mar. 30, 2010, for related U.S. Appl. No. 11/469,589.
Office Action dated Mar. 2, 2010, for related U.S. Appl. No. 12/633,911.
Office Action dated Aug. 19, 2009, for related U.S. Appl. No. 11/469,589.
Office Action dated Jul. 7, 2010 for related U.S. Appl. No. 11/469,589.
Office Action dated Jul. 6, 2010 for related U.S. Appl. No. 12/633,911.
Final Office Action dated Dec. 22, 2010 for related U.S. Appl. No. 11/469,589.
Office Action dated Nov. 10, 2010 for related U.S. Appl. No. 12/633,911.
European Search Report and Written Opinion for counterpart EP Application No. EP 11185274.5, dated Dec. 15, 2011.

\* cited by examiner

METHOD OF MANUFACTURING AND USING ROD-SHAPED PROPPANTS AND ANTI-FLOWBACK ADDITIVES

FIELD OF THE INVENTION

The present invention relates to methods of making and using proppants for fractured earth having a high compressive strength and simultaneously a good conductivity. It also relates to methods of making and using anti-flowback additives for use in fracturing operations.

BACKGROUND

Naturally occurring deposits containing oil and natural gas have been located throughout the world. Given the porous and permeable nature of the subterranean structure, it is possible to bore into the earth and set up a well where oil and natural gas are pumped out of the deposit. These wells are large, costly structures that are typically fixed at one location. As is often the case, a well may initially be very productive, with the oil and natural gas being pumpable with relative ease. As the oil or natural gas near the well bore is removed from the deposit, other oil and natural gas may flow to the area near the well bore so that it may be pumped as well. However, as a well ages, and sometimes merely as a consequence of the subterranean geology surrounding the well bore, the more remote oil and natural gas may have difficulty flowing to the well bore, thereby reducing the productivity of the well.

To address this problem and to increase the flow of oil and natural gas to the well bore, companies have employed the well-known technique of fracturing the subterranean area around the well to create more paths for the oil and natural gas to flow toward the well. As described in more detail in the literature, this fracturing is accomplished by hydraulically injecting a fluid at very high pressure into the area surrounding the well bore. This fluid must then be removed from the fracture to the extent possible to ensure that it does not impede the flow of oil or natural gas back to the well bore. Once the fluid is removed, the fractures have a tendency to collapse due to the high compaction pressures experienced at well-depths, which can be more than 20,000 feet. To prevent the fractures from closing, it is well-known to include a propping agent, also known as a proppant, in the fracturing fluid. The goal is to be able to remove as much of the injection fluid as possible while leaving the proppant behind to keep the fractures open. As used in this application, the term "proppant" refers to any non-liquid material that is present in a proppant pack and provides structural support in a propped fracture. "Anti-flowback additive" refers to any material that is present in a proppant pack and reduces the flowback of proppant particles but still allows for production of oil at sufficient rates. The terms "proppant" and "anti-flowback additive" are not necessarily mutually exclusive, so a single particle type may meet both definitions. For example, a particle may provide structural support in a fracture and it may also be shaped to have anti-flowback properties, allowing it to meet both definitions.

Several properties affect the desirability of a proppant. For example, for use in deep wells or wells whose formation forces are high, proppants must be capable of withstanding high compressive forces, often greater than 10,000 pounds per square inch ("psi"). Proppants able to withstand these forces (e.g., up to and greater than 10,000 psi) are referred to as high strength proppants. If forces in a fracture are too high for a given proppant, the proppant will crush and collapse, and then no longer have a sufficient permeability to allow the proper flow of oil or natural gas. Other applications, such as for use in shallower wells, do not demand the same strength proppant, allowing intermediate strength proppants to suffice. These intermediate strength proppants are typically used where the compressive forces are between 5,000 and 10,000 psi. Still other proppants can be used for applications where the compressive forces are low. For example, sand is often used as a proppant at low compressive forces.

In addition to the strength of the proppant, one must consider how the proppant will pack with other proppant particles and the surrounding geological features, as the nature of the packing can impact the flow of the oil and natural gas through the fractures. For example, if the proppant particles become too tightly packed, they may actually inhibit the flow of the oil or natural gas rather than increase it.

The nature of the packing also has an effect on the overall turbulence generated through the fractures. Too much turbulence can increase the flowback of the proppant particles from the fractures toward the well bore. This may undesirably decrease the flow of oil and natural gas, contaminate the well, cause abrasion to the equipment in the well, and increase the production cost as the proppants that flow back toward the well must be removed from the oil and gas.

The useful life of the well may also be shortened if the proppant particles break down. For this reason, proppants have conventionally been designed to minimize breaking. For example, U.S. Pat. No. 3,497,008 to Graham et al. discloses a preferred proppant composition of a hard glass that has decreased surface flaws to prevent failure at those flaws. It also discloses that the hard glass should have a good resistance to impact abrasion, which serves to prevent surface flaws from occurring in the first place. These features have conventionally been deemed necessary to avoid breaking, which creates undesirable fines within the fracture.

The shape of the proppant has a significant impact on how it packs with other proppant particles and the surrounding area. Thus, the shape of the proppant can significantly alter the permeability and conductivity of a proppant pack in a fracture. Different shapes of the same material offer different strengths and resistance to closure stress. It is desirable to engineer the shape of the proppant to provide high strength and a packing tendency that will increase the flow of oil or natural gas. The optimum shape may differ for different depths, closure stresses, geologies of the surrounding earth, and materials to be extracted.

The conventional wisdom in the industry is that spherical pellets of uniform size are the most effective proppant body shape to maximize the permeability of the fracture. See, e.g., U.S. Pat. No. 6,753,299 to Lunghofer et al. Indeed, the American Petroleum Institute's ("API's") description of the proppant qualification process has a section dedicated to the evaluation of roundness and sphericity as measured on the Krumbein scale. However, other shapes have been suggested in the art. For example, previously-mentioned U.S. Pat. No. 3,497,008 to Graham et al. discloses the use of "particles having linear, parallel, opposite surface elements including cylinders, rods, paralellepipeds, prisms, cubes, plates, and various other solids of both regular and irregular configurations." (Col. 3, lines 34-37.) According to that patent, the disclosed shape configuration has several advantages when used as a proppant, including increased conductivity over spherical particles (col. 4, lines 29-35), greater load bearing capacity for the same diameter as a spherical particle (col. 4, lines 36-38), a higher resistance to being embedded in the fracture wall (col. 4, lines 45-47), and a lower settling rate (col. 4, lines 58-60).

Despite this disclosure of the potential advantages of using rod-like particles for proppants, the industry had not embraced the suggestion. The applicants are not aware of any rod-like particles on the market that are used as proppants or anti-flowback additives. Indeed, more recent patents cast doubt on the effectiveness of using rod-like shapes. For example, U.S. Pat. No. 6,059,034 to Rickards et al. discloses the mixing of rod-like fibrous materials with another proppant material to prevent proppant movement and flowback. According to that patent, "in practice this method has proven to have several drawbacks, including reduction in fracture conductivity at effective concentrations of fibrous materials, and an effective life of only about two years due to slight solubility of commonly used fiber materials in brine. In addition, fiber proppant material used in the technique may be incompatible with some common well-treating acids, such as hydrofluoric acid." (Col. 2, lines 36-43.) Although the rod-like fibrous materials are used in conjunction with another proppant, the patent suggests that rod-like particles in a fracturing fluid are undesirable.

Another property that impacts a proppant's utility is how quickly it settles both in the injection fluid and once it is in the fracture. A proppant that quickly settles may not reach the desired propping location in the fracture, resulting in a low level of proppants in the desired fracture locations, such as high or deep enough in the fracture to maximize the presence of the proppant in the pay zone (i.e., the zone in which oil or natural gas flows back to the well). This can cause reduced efficacy of the fracturing operation. Ideally, a proppant disperses equally throughout all portions of the fracture. Gravity works against this ideal, pulling particles toward the bottom of the fracture. However, proppants with properly engineered densities and shapes may be slow to settle, thereby increasing the functional propped area of the fracture. How quickly a proppant settles is determined in large part by its specific gravity. Engineering the specific gravity of the proppant for various applications is desirable because an optimized specific gravity allows a proppant user to better place the proppant within the fracture.

Yet another attribute to consider in designing a proppant is its acid-tolerance, as acids are often used in oil and natural gas wells and may undesirably alter the properties of the proppant. For example, hydrofluoric acid is commonly used to treat oil wells, making a proppant's resistance to that acid of high importance.

Still another property to consider for a proppant is its surface texture. A surface texture that enhances, or at least does not inhibit, the conductivity of the oil or gas through the fractures is desirable. Smoother surfaces offer certain advantages over rough surfaces, such as reduced tool wear and a better conductivity, but porous surfaces may still be desirable for some applications where a reduced density may be useful.

All of these properties, some of which can at times conflict with each other, must be weighed in determining the right proppant for a particular situation. Because stimulation of a well through fracturing is by far the most expensive operation over the life of the well, one must also consider the economics. Proppants are typically used in large quantities, making them a large part of the cost.

Attempts have been made to optimize proppants and methods of using them. Suggested materials for proppants include sand, glass beads, ceramic pellets, and portions of walnuts. The preferred material disclosed in previously-mentioned U.S. Pat. No. 3,497,008 is a hard glass, but it also mentions that sintered alumina, steatite, and mullite could be used. Conventional belief is that alumina adds strength to a proppant, so many early proppants were made of high-alumina materials, such as bauxite. The strength of these high-alumina materials is believed to be due to the mechanical properties of the dense ceramic materials therein. See, e.g., U.S. Pat. Nos. 4,068,718 and 4,427,068, both of which disclose proppants made with bauxite.

Bauxite is a natural mineral comprising various amounts of four primary oxides: alumina ($Al_2O_3$, typically from about 80% to about 90% by weight), silica ($SiO_2$, typically from about 1% to about 12% by weight), iron oxide ($Fe_2O_3$, typically from about 1% to about 15% by weight), and titania ($TiO_2$, typically from about 1% to about 5% by weight). After calcining or sintering, bauxite is known to have a higher toughness but a lower hardness than technical grade alumina-based ceramics. Since toughness is a primary mechanical characteristic to consider in improving the crush resistance or compressive strength of ceramics, bauxite is of interest for use in proppants. The microstructure of bauxite is characterized primarily by three phases: 1) a matrix of fine alumina crystal; 2) a titania phase where titania is complexed with alumina to form aluminum titanate ($Al_2TiO_5$); and 3) a mullite phase ($3Al_2O_3, 2SiO_2$). For the first two phases a partial substitution of aluminum by iron atoms is possible. To achieve good mechanical characteristics as a proppant, bauxite with lower levels of silica and iron oxide are preferred.

For example, previously-mentioned U.S. Pat. No. 4,427,068 discloses a spherical proppant comprising a clay containing silica that adds a glassy phase to the proppant, thereby weakening the proppant. Furthermore, the silica of that patent is so-called "free" silica. In general, high amounts of silica reduce the strength of the final proppant. In particular, it is believed that proppants containing more than 2% silica by weight will have reduced strength over those with lower silica contents. Other so-called impurities are also believed to reduce the strength of the proppant.

Early high strength proppants were made using tabular alumina which was a relatively expensive component. For this reason, the industry shifted from using tabular alumina to other alumina sources, such as bauxite. By the late 1970's, the development focus in the industry shifted from high strength proppants to intermediate or lower strength, lower density proppants that were easier to transport and use, and were less expensive. Over the next 20 years, the industry focused on commercialization of lower density proppants and they became commonly used. The primary method of reducing the density of proppants is to replace at least a portion of the higher density alumina with lower density silica. According to U.S. Pat. No. 6,753,299, "the original bauxite based proppants of the early 1970's contained >80% alumina (Cooke). Subsequent generations of proppants contained an alumina content of >70% (Fitzgibbons), 40% to 60% (Lunghofer), and later 30% to <40% (Rumpf, Fitzgibbons)." Thus, as to both product development and proppant use, there was a retreat in the industry from proppants manufactured from high-alumina materials such as bauxite.

Today, as resources become more scarce, the search for oil and gas involves penetration into deeper geological formations, and the recovery of the raw materials becomes increasingly difficult. Therefore, there is a need for proppants that have an excellent conductivity and permeability even under extreme conditions. There is also need for improved anti-flowback additives that will reduce the cost of production and increase the useful life of the well.

SUMMARY OF THE INVENTION

A method is provided for making a proppant or anti-flowback additive. The method comprises providing a composition comprising at least about 90% by weight alumina and between about 0.15% and about 3.5% by weight $TiO_2$; milling the composition; forming at least one rod from the milled composition; and sintering the at least one rod.

Another method is provided for making a proppant or anti-flowback additive. The method comprises forming a rod-shaped article from a milled composition, where the milled composition comprises at least about 90% by weight alumina and between about 0.15% and about 3.5% by weight $TiO_2$. The article is also sintered.

Another method for making a proppant or anti-flowback additive comprises sintering a rod-shaped article made from a milled composition comprising at least about 90% by weight alumina and between about 0.15% and about 3.5% by weight $TiO_2$.

Another method of making a proppant or anti-flowback additive comprises sintering a rod-shaped article formed from a milled composition, the milled composition comprising at least about 80% technical grade alumina by weight and between about 0.1% by weight and about 20% by weight of material containing at least one other oxide.

A method is provided for fracturing subterranean formations. The method comprises injecting a fluid containing a sintered rod-shaped article made from a milled composition, where the milled composition comprises at least about 90% by weight alumina and between about 0.15% and about 3.5% by weight $TiO_2$.

Another method of fracturing subterranean formations comprises injecting a fluid containing a sintered rod-shaped article formed from a milled composition, the milled composition comprising at least about 80% technical grade alumina by weight and between about 0.1% by weight and about 20% by weight of material containing at least one other oxide.

The foregoing background and summary are not intended to be comprehensive, but instead serve to help artisans of ordinary skill understand the following implementations consistent with the invention set forth in the appended claims. In addition, the foregoing background and summary are not intended to provide any limitations on the claimed invention.

DESCRIPTION OF THE INVENTION

Reference will now be made in detail to embodiments of the present invention. A high strength proppant and anti-flowback additive having a rod shape is found to achieve superior conductivity and other benefits when used in hydraulic fracturing of subterranean formations surrounding oil and/or gas wells under relatively high closing pressures.

A high strength proppant in accordance with one embodiment of the present invention is a solid rod-shaped particle prepared by sintering an alumina-containing material, such as, for example, technical grade alumina, bauxite, or any other suitable combination of oxides thereof. The rod-shaped particle may have a solid trunk bounded by two substantially parallel planes. In one preferred embodiment of the present invention, the two substantially parallel planes may be substantially circular, thereby creating a cylindrical trunk. Other suitable shapes may be also be used as the bounding planes. It is preferable that the bounding plane shapes have a minimum number of angles, such as circles or ovals or other symmetrical or asymmetrical shapes with rounded edges, such as egg curves, because angular particles tend to pack more tightly together and concentrate the pressure on the contact points between the particles because of their sharp edges. This increased pressure can lead to an increased likelihood that the proppants will undesirably break into fine particles. Angular shapes, such as triangles, squares, rectangles, etc., where one or more of the corners is rounded may also be used as the bounding planes without departing from the spirit of the present invention. The rod bounded by these different shapes may take on trunks of different shapes, for example, in the shape of a triangular prism, without departing from the spirit of the present invention.

The sintered rod is found to exhibit superior hardness and toughness. As known in the art, increased alumina ($Al_2O_3$) content in the sintered product results in increased hardness and toughness. Sintered rods consistent with one embodiment of the present invention may have a high alumina content, for example, greater than about 80% alumina by weight. In some embodiments, the alumina content may be increased to greater than about 90% by weight. It may further be preferable that the alumina content be greater than about 92% by weight, with the optimum hardness and toughness being achieved between about 92% and about 96% alumina by weight.

It has also been found that the presence of aluminum titanate ($Al_2TiO_5$) in the sintered rod results in improved hardness and toughness. The sintered rod may contain between about 0.2% and about 4% aluminum titanate, preferably between about 0.5% and about 3%, and most preferably between about 1% and about 2.5%. In one embodiment, the aluminum titanate is formed during sintering when the pre-sintered material includes a small percentage of $TiO_2$. The $TiO_2$ may be contributed by non-bauxitic sources or, preferably, bauxite. In one embodiment, the pre-sintered mixture may comprise by weight between about 0.15% and about 3.5% $TiO_2$, preferably between about 0.3% and about 2.7% $TiO_2$, and most preferably between about 0.4% and about 2.3% $TiO_2$. During the sintering process, which is preferably conducted at a temperature from 1300° C. to 1500° C., the $TiO_2$ forms a complex with the alumina to form the aluminum titanate phase.

The sintered rod may also be formulated to restrict its $SiO_2$ content to a specific low level (e.g., less than about 4% by weight, and preferably no more than about 2% by weight). When the level is silica is greater than 4%, silica bridges the alumina crystals during the sintering step and makes the ceramic material more fragile and breakable. By limiting the $SiO_2$ content of the proppant, the sintered rod formulation ensures optimum strength from a high percentage of alumina (e.g., greater than 92%) reinforced by the formation of aluminum titanate while at the same time minimizing the weakening effects of $SiO_2$.

Iron oxide, commonly found in bauxite, can also weaken the proppant. The sintered rod should contain no more than 10% by weight iron oxide. Where a substantial portion of the mixture (e.g., over 80% by weight) to be sintered is compromised of an alumina material that contains iron oxide (e.g., bauxite) that material should comprise iron oxide in amounts not to exceed about 10% by weight, and preferably no more than 8% by weight. This will help ensure that the sintered rod has superior strength throughout while still being able to break into substantially uniform pieces under high closing pressure as will be further discussed below. It may also limit the production of excessive undesirable fines at high closing pressures.

The high percentage of alumina in the sintered rods may come from a number of bauxitic and non-bauxitic sources. For example, a high-quality bauxite containing a high level of alumina (e.g., 85% or more) may be used as the primary source of alumina for the final composition. In addition to containing alumina, bauxite typically also contains additional oxides, such as $SiO_2$, $TiO_2$, $Fe_2O_3$, $ZrO_2$, MgO. As mentioned above, excessive amounts of certain of these oxides can weaken the sintered rod. Only bauxite that will not contribute excessive amounts of undesirable impurities to the mixture, based upon the amount of bauxite present in the mixture, should be used. Suitable bauxite may come from, for example, the Weipa mine in Australia, or mines in Brazil, China, or Guinea. Since bauxite may not have a high enough alumina content to achieve the desired high alumina content in the final product, a non-bauxitic source of alumina, such as "technical grade alumina" or "pure alumina" may be used to supplement the alumina in the bauxite. Technical grade alumina contains, for example, 98%-99% alumina with only a small amount of impurities.

In an alternative method of making a suitable sintered rod, a non-bauxitic source such as technical grade alumina may be used as the primary source for the alumina contained in the final sintered rod. A relatively small percentage of bauxite may be used as a supplemental source of alumina, and may contribute a beneficial amount of $TiO_2$ to provide the desired aluminum titanate in the final sintered rod. Because the bauxite is used in smaller amounts in this embodiment, a bauxite containing higher levels of impurities may be used, so long as the overall amount of the impurities is relatively low in the final sintered product.

The alumina-containing material (e.g., bauxite) may optionally be sized using various milling or grinding techniques, including both attrition grinding and autogenous grinding (i.e., grinding without a grinding medium), and may be ground by either a dry or wet grinding process. The grinding may be accomplished in a single step or may involve multiple grinding steps.

Proper sizing prior to forming the sintered rods can increase the compacity of the feed and ultimately result in a stronger proppant or anti-flowback additive. In one embodiment, a jet mill may be used to prepare a first batch of particles having a first particle size distribution. In a jet mill, the particles are introduced into a stream of fluid, generally air, which circulates the particles and induces collisions between the particles. Using known techniques, the forces in the jet mill can alter the particle size distribution of the particles to achieve a desired distribution. For example, one may vary the type of fluid used in the mill, the shape of the milling chamber, the pressure inside the mill, the number and configuration of fluid nozzles on the mill, and whether there is a classifier that removes particles of a desired size while leaving others in the mill for additional milling. The exact configuration will vary based on the properties of the feed material and the desired output properties. The appropriate configuration for a given application can be readily determined by those skilled in the art.

After the first batch of particles having the first particle size distribution is prepared, a second batch of particles may be jet milled to a second particle size distribution. The first and second batch particle size distributions and milling conditions, and the conditions under which they are combined, are selected to form the desired final particle size distribution of the combined batches prior to sintering. Using this technique, a bi-modal particle size distribution may be obtained. The advantage of preparing a bi-modal feed is that it may contain additional fine particles to pack between the coarser particles, leading to increased compacity and density prior to sintering. Those skilled in the art will appreciate that one need not stop at two batches with different particle size distributions, but could combine three or more batches to achieve multi-modal particle size distributions prior to sintering. The batches of particles can be combined using any mixing technique known in the art for mixing dry powders, such as employing intensive mixers (e.g., Eirich mixers), which can quickly produce a homogeneous powder blend. Using this approach, it has surprisingly been discovered that the resultant sintered rod achieves better compacity and crush resistance.

In another embodiment, the alumina-containing material may optionally be sized in a ball mill. Similar to jet milling multiple batches to different particle sizes and mixing them, ball milling may result in a multi-modal particle size distribution, which can improve the compacity of the powder. However, in contrast to a jet milling process, acceptable results may be achieved in a single ball-milled batch of particles (i.e., there is no requirement to prepare multiple batches and mix them). Of course, there is no technical reason to avoid combining multiple ball-milled batches, and one embodiment consistent with the present invention involves ball milling multiple batches and mixing them to form a powder with a desired multi-modal particle size distribution. In another embodiment, batches with two different particle size distributions can be simultaneously milled in the ball mill, resulting in a powder with a multi-modal particle size distribution.

Regarding the mechanics of the ball milling process, a ball mill contains a chamber in which the alumina-containing material and a collection of balls collide with each other to alter the material's particle size. The chamber and balls are typically made of metal, such as aluminum or steel. The appropriate configuration for the ball mill (e.g., the size and weight of the metal balls, the milling time, the rotation speed, etc.) can be readily determined by those skilled in the art. The ball milling process can be either a batch process or a continuous process. Various additives may also be used to increase the yields or efficiency of the milling. The additives may act as surface tension modifiers, which may increase the dispersion of fine particles and reduce the chance that the particles adhere to the walls and ball media. Suitable additives are known to those skilled in the art, and include aqueous solutions of modified hydroxylated amines and cement admixtures. In one embodiment, the ball mill is configured with an air classifier to reintroduce coarser particles back into the mill for a more accurate and controlled milling process. Like the jet milling embodiment described above, ball milling has surprisingly been discovered to result in a proppant or anti-flowback additive with improved compacity and crush resistance.

While various particle sizes and size distributions may be useful in preparing proppants and anti-flowback additives, the pre-milled alumina-containing material may have at least 95% of its particles smaller than 500 microns as measured by sieving or a Microtrac particle size analyzer, and may have all of its particles smaller than 500 microns. After milling, in certain embodiments the material has a d50 of less than 10 microns, and may have a d50 of less than 5 microns, less than 3 microns, or even less than 1.5 microns. In one embodiment, the powder has a d50 from 1.5 microns to 2 microns, and ratio of the d90 to the d10 from 4 to 8. The d10, d50, and d90 may be measured using a laser microsizer, such as the Malvern Mastersizer 2000. The milled material may also have substantially all of its particles smaller than 30 microns. A broad particle size distribution is preferred to a narrow one, as it is believed that the broader distribution results in an increase of the compacity of the material and the strength of the final sintered rod.

The sintered rod in accordance with one embodiment of the present invention may be prepared by first mixing the desired alumina-containing materials with at least one binding agent and/or solvent. The binding agent and/or solvent is one of those well known in the industry. Some possible binding agents include, for example, methyl cellulose, polyvinyl butyrals, emulsified acrylates, polyvinyl alcohols, polyvinyl pyrrolidones, polyacrylics, starch, silicon binders, polyacrylates, silicates, polyethylene imine, lignosulfonates, alginates, etc. Some possible solvents may include, for example, water, alcohols, ketones, aromatic compounds, hydrocarbons, etc. Other additives well known in the industry may be added as well. For example, lubricants may be added, such as ammonium stearates, wax emulsions, elieic acid, Manhattan fish oil, stearic acid, wax, palmitic acid, linoleic acid, myristic acid, and lauric acid. Plasticizers may also be used, including polyethylene glycol, octyl phthalates, and ethylene glycol. The mixture may then be extruded, for example, through a die, to form a rod having a cross-section of a desired shape, such as a substantially circular shape or any other suitable shape. The process of extrusion may be performed using extrusion methods known in the industry. For example, the extrusion process may be a batch process, such as by forming the rods using a piston press, or may be a continuous process using an extruder containing one or more screws. Loomis manufactures a piston press that may be used to batch produce the rods, while Dorst and ECT both make extruders that contain one or more screws that may be used in the continuous extrusion production method. Other suitable equipment and manufacturers will be readily ascertainable to those of skill in the art.

The extruded rod is then dried, for example, at about 50 degrees Celsius or any other effective temperature, and reduced to the desired rod length, as needed. Any suitable drying process known to the industry may be used. For example, the rods may be dried using electric or gas driers. In some embodiments, the drying process may be performed by microwave, with a continuous drying process being preferred. The reduction to the desired length may be achieved through cutting using, for example, a rotating blade, a cross cutter, a strand cutter, a longitudinal cutter, a cutting mill, a beating mill, a roller, or any other suitable reducing mechanism. In one embodiment of the invention the reduction to the desired length occurs as a result of the drying process, forming a mixture of rods having a broad length distribution, and no cutting step is required. The length reduction occurs during the drying as a result of the mechanical properties of the extruded rod. In this embodiment, the manufacturing process is simplified and lower in cost as waste levels are reduced, cutting equipment need not be purchased nor maintained, and less energy will be consumed in the process. In another embodiment, where a narrow length distribution is desired, the rods having the desired length are obtained by any one of various selection methods known to those skilled in the art, including visual or mechanical inspection, or sieving. However, classical sieving methods tend to break the weaker rods. This is not necessarily a disadvantage, as only the stronger rods are selected by sieving. The appropriate selection method will need to be determined on a case-by-case basis, and will depend on the goal of the selection process.

The formed rod is then sintered at about 1,300 degrees Celsius to about 1,700 degrees Celsius to form the sintered rod suitable for use as a proppant or anti-flowback additive. In some embodiments, the sintering temperature is preferably between about 1,400 degrees Celsius to about 1,600 degrees Celsius. The sintering equipment may be any suitable equipment known in the industry, including, for example, rotary or vertical furnaces, or tunnel or pendular sintering equipment.

The sintered rods may optionally be coated with one or more coatings. Applying such a coating can provide various advantages, including the ability to control the dispersion of fines that may be generated when the rods break under injection or closure pressures. Many coatings have been suggested in the art, with U.S. Pat. No. 5,420,174 to Dewprashad providing the following non-exhaustive list of natural and synthetic coatings: "natural rubber, elastomers such as butyl rubber, and polyurethane rubber, various starches, petroleum pitch, tar, and asphalt, organic semisolid silicon polymers such as dimethyl and methylphenyl silicones, polyhydrocarbons such as polyethylene, polyproplylene, polyisobutylene, cellulose and nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, mineral and petroleum waxes." Additional coatings include urethane resins, phenolic resins, epoxide phenolic resins, polyepoxide phenolic resins, novolac epoxy resins, and formaldehyde phenolic resins. One or more of these coatings can be applied to the sintered rods using any known method, including both batch and on-the-fly mixing.

In one embodiment of the present invention, the sintered rod has parallel bounding planes that are substantially circular, where the substantially circular planes have an average diameter of between about 0.5 mm and about 2 mm. In some embodiments, the preferred diameters may be between about 0.5 mm and about 1.5 mm. Sintered rods having a length of up to about 20 mm, preferably up to 10 mm, may be suitable for use as proppants or anti-flowback additives in accordance with embodiments of the present invention. In some embodiments, the preferred rod length may be between about 1 mm and about 5 mm, or more preferably between about 2 mm and about 4 mm.

In some embodiments, the diameter of the substantially circular planes may correspond with diameters specified in the API standard for spherical proppants. In one embodiment, the preferred rod length may be the naturally sustainable length limited by the drying process, for example, the length at which the rod will not break during the drying process. As discussed above, this approach can provide a useful proppant or anti-flowback additive without the step of cutting it to a particular length, thereby simplifying and lowering the cost of the manufacturing process, reducing waste produced during the cutting step, simplifying logistics due to the reduced need to produce, store, package, and ship proppants and anti-flowback additives of different sizes, and simplifying the planning of the fracturing job as there is no need to determine the needed length of the proppant or anti-flowback additive for a particular job.

Depending on the requirements for a particular fracture or proppant pack, the fracturing fluid may include either a narrow or broad length distribution of the rods before closure. To create a narrow length distribution, rods may be cut as described above to ensure a more uniform length distribution. More varied lengths may exist in a fracturing fluid with a broader length distribution before closure. While prior to closure a collection of sintered rods with a broad length distribution may have different physical properties from a collection having a narrow length distribution, after closure both collections of sintered rods may behave similarly in the fracture. This is primarily because the sintered rods in accordance with an embodiment of the present invention have the unique ability to break into substantially uniform rods of smaller sizes under a closing pressure. This unique breaking property is discussed in more detail below. However, as a brief example, in a pack formed from a fracturing fluid of sintered rods having varied lengths, the longer rods will break first under lower closing pressure (e.g., 2,000 psi) into intermediate and smaller rods, which may break again into smaller pieces at higher closing pressure (e.g., 5,000 psi). In this way, the pack made from fracturing fluid of varied length sintered rods may ultimately achieve substantially uniform lengths at certain higher closing pressures. As used herein, rods having "substantially uniform length" are rods that have the same length, plus or minus 20%. Preferably, these rods will have the same length, plus or minus 10%.

Although the sintered rods will break to the appropriate size in the fracture, it has been discovered that shorter sintered rods with a narrow length distribution may perform better than longer rods that break to the same size. Thus, for some fracturing applications it may be desirable to determine an optimum length and prepare the sintered rod accordingly. Achieving the desired length distribution may be accomplished by a) cutting the material after extrusion, such as by using a rotating knife next to the extrusion die; b) cutting the material before or after drying, such as by using a combination of mesh and knives, with the mesh being placed after the knives to sieve the rods using known sieving techniques, including the use of bouncing rubber balls on top of the mesh to aid in sieving; c) cutting the material after sintering, such as by using an Eirich mixer or a ball mill; or d) any of the other various methods for sizing known to those skilled in the art.

A sintered rod having the above dimensions may have a length to width ratio (this term is also intended to encompass the length to diameter ratio, if the rod has a circular cross-section) of about 1.5:1 to about 20:1. In some embodiments, it may be desirable that the length to width ratio be between about 1.5:1 to about 10:1, more preferably between about 1.5:1 and about 7:1. It may be further preferable to restrict the length to width ratio from about 2:1 to about 4:1 in some embodiments. It is desirable that the sintered rod have a length to width ratio of greater than 1:1 because the elongated shape introduces more disorder into the proppant pack, which increases void spaces between the proppants and in turn increases the conductivity of the proppant pack. As an example, an experiment was conducted in which equal volumes of a spherical proppant of the prior art and a rod-shaped proppant of the present invention, each with a bulk density of about 2.01 g/cm$^3$ were placed in separate Erlenmeyer flasks. Distilled water was introduced into each flask until the proppants were submerged in water. The water volume needed to penetrate the voids was then measured. The volume of water poured into the flask represents the void volume. For the spherical proppant, 5.8 mls of water was necessary to fill the void volume. For the rod-shaped proppant, 10.7 mls of water was necessary-almost double that of the spherical proppant. This comparison demonstrates that for the same volume of proppant, the rod-shaped proppant may have significantly more void volume than the same volume of a spherical proppant.

In another experiment, approximately 32.9 g each of two spherical proppants and one rod-shaped proppant consistent with the present invention were placed in separate Erlenmeyer flasks each filled with 50 mls of distilled water. The rod-shaped proppant had a broad length distribution and an average width or diameter of between about 1.1 mm and about 1.3 mm. All three of the proppants had a bulk density between about 2.00 g/cm$^3$ and about 2.01 g/cm$^3$. The flasks were shaken slightly, but only to the extent necessary to provide a level surface on the top of the proppant. The volume level of the proppants was then measured, as was the level of the water. From this information, the void volume within the proppant was calculated using the following equations:

$$V_{void} = V_{proppants} - \Delta V_{liquid}$$

where $$\Delta V_{liquid} = V_{liquid\,final} - V_{liquid\,initial}$$

The void volumes of the two spherical proppants were measured to be about 33% and about 38%, while the void volume of the rod-shaped proppant was found to be about 50%. This further demonstrates that for the same mass of proppant, a rod-shaped proppant consistent with the present invention may exhibit more void volume in the proppant pack, leading to a larger space for oil or natural gas to flow to the well bore. The flasks were then shaken and tapped for approximately 2 minutes with the goal of packing the proppant particles more tightly. The same levels were measured, and the void volume in the spherical proppants did not change in any significant manner. As expected, the void volume in the rod-shaped proppant decreased somewhat, but it still contained a void volume of about 44%. This packed void volume was still higher than that of either of the spherical proppants. Table 1 below provides the data from these experiments.

TABLE 1

| Proppant | Tapped? | Weight | $V_{initial}$ | $V_{final}$ | $V_{proppant}$ | $V_{void}$ | % voids |
|---|---|---|---|---|---|---|---|
| Spherical 1 | NO | 32.7 g | 50 ml | 60 ml | 16 ml | 6 ml | 38% |
| Spherical 1 | YES | 32.7 g | 50 ml | 60 ml | 16 ml | 6 ml | 38% |
| Spherical 2 | NO | 32.9 g | 50 ml | 60 ml | 15 ml | 5 ml | 33% |
| Spherical 2 | YES | 32.9 g | 50 ml | 60 ml | 15 ml | 5 ml | 33% |
| Rod-shaped | NO | 32.9 g | 50 ml | 59 ml | 18 ml | 9 ml | 50% |
| Rod-shaped | YES | 32.9 g | 50 ml | 59 ml | 16 ml | 7 ml | 44% |

The desirable properties of sintered rods made in accordance with the present invention are believed to be associated, at least in part, with their relatively high apparent specific gravity. While "specific gravity" is known in the art to refer to the weight per unit volume of a material as compared to the weight per unit volume of water at a given temperature, "apparent specific gravity" as used in this application refers to the weight per unit volume of a material including only the material itself and its internal porosity as compared to the weight per unit volume of water. Thus, in the apparent specific gravity computation first the weight of the material being measured is determined. Then the volume of the material, including only the volume of the material and its internal pores, is determined. For some materials, this step is easily accomplished by placing the material in water and measuring the volume of the displaced water. Indeed, under certain circumstances water may appropriately be used for applications that compare one proppant to another, such as in the void volume experiments described above. For proppants of this type, however, water may permeate and fill in the interior pores, giving inaccurate absolute results such as those desired when computing apparent specific gravity. Consequently, it is necessary to measure the displacement in mercury or some similar fluid that will not permeate the material and fill its internal pores. The weight per unit volume measured in this manner is then compared to the weight per unit volume of water at a given temperature. The specific temperature used in accordance with this application is room temperature, or about 25 degrees Celsius.

A sintered rod prepared as described above may have an apparent specific gravity of up to about 3.98. In some embodiments, it may be desirable that the apparent specific gravity of the sintered rods be between about 3.0 and about 3.98. It may be further preferable that the apparent specific gravity be between about 3.2 and about 3.95 in some embodiments. The specific range chosen may be based on a variety of factors including, for example, the intended use, which may involve considerations such as fracture depth, the type of carrier fluid, etc. The sintered rod may also have a bulk density of about 1.5 g/cm$^3$ to about 2.5 g/cm$^3$. In some embodiments, the bulk density may preferably be between about 1.7 g/cm$^3$ to about 2.3 g/cm$^3$. Bulk density as used in this application and understood within the art refers to the mass of a particular volume of sintered rods divided by the volume occupied by the sintered rods where the mass has been compacted. This is sometimes referred to as "packed" or "tapped" bulk density. The measurement method of the "packed" or "tapped" bulk density is that set forth by the Federation of European Producers of Abrasives (FEPA) as standard number 44-D. The volume used for the calculation of bulk density includes both the space between the sintered rods and the pore spaces (both interior and exterior) of the sintered rods.

It is known within the art that proppants having a high apparent specific gravity and high alumina content exhibit superior crush resistance. Crush resistance as used in this application is measured according to procedures promulgated by the API for measuring proppant crush. Specifically, a certain volume of the sintered rods of a particular dimension range (i.e., 1.1 mm-1.3 mm in diameter and 2 mm-14 mm in length) is loaded into a crush cell with a floating piston. For a desired stress level, the piston presses onto the sintered rods at the required stress level (e.g., 20,000 psi) for a set period of time (e.g., two minutes). The weight percentage of crushed materials, for example, gathered by sieving the fines through a sieve of a desired size (e.g., less than about 1 mm), is measured.

Results of tests using API crush resistance procedures indicate the sintered rods consistent with the present invention exhibit high crush resistance up to 20,000 psi. At 10,000 psi only between about 5% by weight and about 9% by weight were crushed. At 15,000 psi between about 9% by weight and about 19% by weight were crushed. When the optional milling step is used, it is believed that in some embodiments only about 7% to about 15% of the particles may be crushed at 15,000 psi, in other embodiments only about 7% to about 13% may be crushed, still others may have only about 8% to about 12% crushed, and in other embodiments only about 9% to about 11% of the particles may be crushed, with all percentages being given by weight. For example, in a sample of sintered rods consistent with one embodiment of the invention, only about 12% by weight were crushed at 15,000 psi. The variation in the crush resistance at a given pressure is due, at least in part, to variations in the lengths of the rods, the diameters of the rods, the feed material, any impurities in the feed, the sintering temperature, and the sintering time.

Because crush resistance alone is generally insufficient to illustrate the potential conductivity that is essential to a proppant, a conductivity test according to the API Recommended Practice 61 for measuring conductivity was also conducted. In a particular test, a quantity of sintered rods in accordance with one embodiment of the present invention was placed and leveled in a test cell between Ohio sandstone rocks. Ohio sandstone has a static elastic modulus of approximately 4 million psi and a permeability of 0.1 mD. Heated steel plates provided the desired temperature simulation for the test. A thermocouple was inserted into the middle portion of the rod pack to record the temperature. A servo-controlled loading ram provided a closing pressure on the proppant between the Ohio sandstone rocks. The test cell was initially set at 80° F. and 1,000 psi. The cell was then heated to 250° F. and held for 4 hours before the stress was increased to 2,000 psi over 10 minutes. After 50 hours at 2,000 psi, measurements were made, and then the stress level was raised to 3,000 psi. The same procedures were applied and subsequent measurements were made at 5,000 psi, 7,500 psi, and 10,000 psi over a total of 254 hours.

Measurements were taken of the pressure drop in the middle of the sintered rod pack to enable calculation of the permeability at a particular stress condition according to Darcy's Law. Specifically, permeability is part of the proportionality constant in Darcy's Law, which relates flow rate and fluid physical properties (e.g., viscosity) to the stress level applied to a pack of sintered rods. Permeability is a property specifically relating to a pack of sintered rods, not the fluid. Conductivity, on the other hand, describes the ease with which fluid moves through pore spaces in a pack of sintered rods. Conductivity depends on the intrinsic permeability of a sintered rod pack as well as the degree of saturation. In particular, conductivity expresses the amount of water that will flow through a cross-sectional area of a sintered rod pack under the desired stress level.

Specifically, to measure conductivity, a 70 mbar full range differential pressure transducer was started. When the differential pressure appeared to be stable, a tared volumetric cylinder was placed at the outlet and a stopwatch was started. The output from the differential pressure transducer was fed to a data collector, which recorded the output every second. Fluid was collected for 5 to 10 minutes and then the flow rate was determined by weighing the collected effluent. The mean value of the differential pressure was retrieved from a multimeter, as were the peak high and low values. If the difference between the high and low values was greater than 5% of the mean, the data was disregarded. Temperature was recorded at the start and end of the flow test period. Viscosity of the fluid was obtained using the measured temperature and viscosity tables. At least three permeability determinations were made at each stage using Darcy's Law. The standard deviation of the determined permeabilities had to be less than 1% of the mean value before the test was accepted.

The following table summarizes the results of the above conductivity test conducted on sintered rods consistent with the present invention, as well as high strength and intermediate strength spherical particles. The rods were between about 0.9 mm and 1.1 mm in diameter, and had a narrow length distribution centered at 10 mm.

TABLE 2

| | Conductivity | | |
| --- | --- | --- | --- |
| Pressure (psi) | Rods | High Strength Spherical | Intermediate Strength Spherical |
| 5000 | 31875 | 6048 | 5487 |
| 7500 | 11405 | 4293 | 3589 |
| 10000 | 4390 | 2651 | 2113 |
| 12500 | 751 | 1746 | 1314 |
| 15000 | 207 | 1181 | 936 |

All measures except pressure are in mD-ft.

When the optional milling step is employed, the conductivity of the rods increases to about 5200 mD-ft at 10,000 psi and about 3600 mD-ft at 12,500 psi. The surprisingly superior conductivity and permeability of the rod-shaped proppants at high closure pressure as compared to spherical proppants that are currently being used in the industry was found to be largely attributable to the proppant's unique rod shape and its unexpected breaking behavior under closing pressure. Particularly, unlike a sphere, which has a single load bearing point at which the closing pressure converges, often leading to crushing, a rod has a much broader area of contact in a multi-layered pack under pressure, allowing it to distribute the pressure more evenly and thereby reducing crushing and embedment at comparable closing pressures.

It is known that crushing of the current spherical proppants leads to the creation of fines. Essentially the spheres break under pressure into very minute, dust-like pieces that have a tendency to create densely packed fine layers that significantly reduce both permeability and conductivity. Additionally, the fines tend to have sharp edges, which when in contact with surrounding intact spheres, concentrate the compression forces onto other spheres at the sharp contact points and contribute to the destruction of the surrounding spheres in the proppant pack.

The sintered rods, besides being more resistant to crushing under comparable closing pressures due to their unique shape, also exhibit the surprising property of being able to break into generally uniform sized smaller rods when breakage does occur. This behavior is in contrast to the failure of spherical particles, described above, which typically disintegrate when they fail and create a large amount of fines. Instead of creating dust-like fines, the rod-shaped proppants break into smaller rod-shaped proppants. The breaking behavior of the sintered rods is attributable, at least in part, to the specific composition of a large amount of alumina with a small amount of other synergistic oxides in the sintered rod formulation. For example, a small percentage of $TiO_2$ in the sintered rod composition, preferably contributed by bauxite, allows for the formation of aluminum titanate ($Al_2TiO_5$) during the sintering process, which provides extra strength to the sintered rod proppant or anti-flowback additive. In one embodiment, the sintered rod may contain between about 0.2% and about 4% aluminum titanate by weight, preferably between about 0.5% and about 3% by weight, and more preferably between about 1% and about 2.5% by weight. In some embodiments the bauxite before sintering may comprise by weight between about 0.5% and about 4% $TiO_2$, preferably between about 1% and about 3% $TiO_2$, and more preferably between about 2% and about 3% $TiO_2$.

The rods also maintain their unique rod shape as they break into smaller rods, thereby maintaining their efficacy as a proppant. In one experiment, two collections of 100 g of sintered rods, one having a broad length distribution and the other having a narrow one, were tested according to API Procedure 60 at 22,000 psi. As used in this application, a narrow length distribution is one where at least about 60% of the rods have lengths within about 1 mm of the mean. All other distributions are considered broad. After the experiment, the sintered rods of both sizes were examined and found to have reached a very narrow length distribution centered around 4 mm. Even at this high pressure numerous rods were still intact.

The manner in which the sintered rods break has a number of advantages. The smaller rods do not behave like fines that settle into dense packs between still-intact spherical proppants. Thus, there is little to no reduction in conductivity or destruction of neighboring proppants as occurs with fines in spherical proppant packs. It is also believed that the smaller rod pieces that result from breaking of a larger sintered rod exhibit the same or similar beneficial properties as the larger sintered rod. The smaller rods remain superior in their load carrying capability and resistance to embedment. Moreover, to the extent fines are generated, they are believed to be less destructive to the proppant pack than the fines generated when other proppants, such as spherical proppants, break down. This further maintains permeability and conductivity. In view of these advantages, a pack of sintered rods may therefore exhibit superior longevity, conductivity, and permeability over a pack of sintered spheres under similarly high closure pressure, even when the closing pressure causes breakage of the sintered rods. As discussed above, in some applications better performance may be achieved by using shorter rods with a narrow length distribution.

It is also observed that the sintered rod reduces the non-Darcy flow effect (a characterization of fluid flow that accounts for the turbulence generated as the oil or natural gas flows through the proppant pack). Non-Darcy flow reduces well production significantly and strips the deposited proppants from the fracture, causing them to flow back to the well bore with the natural gas or oil. In particular, the non-Darcy flow effect is mainly experienced in high flow-rate gas and volatile oil wells. The effect arises from the fact that fluid flow near the well bore has a turbulence component due to a significant pressure drop along the fracture and the convergence of flow at the well bore, which results in high flow velocities. This effect is particularly significant in natural gas wells due to the highly expandable and less viscous nature of natural gas. The non-Darcy flow effect is expressed as:

$$dp/dl = \mu p v/k + \beta \rho v^2$$

where p is the pressure drop in the fracture, l is the length of the fracture, $\mu$ is the viscosity of the gas, v is the velocity of the gas, k is the permeability of the fracture, $\beta$ is the turbulence coefficient in the fracture, and $\rho$ is the density of the natural gas/oil.

A comparison was performed with regard to three different possible proppant shapes to determine the effect of shape on the turbulence coefficient $\beta$. It was found that an elongated shape, such as the sintered rod of the present invention, is associated with a much reduced $\beta$ as compared to a spherical or irregular shape. Therefore, rod-shaped proppants would be subject to less stripping due to the non-Darcy flow effect and result in less proppant flowing back to the well bore.

Reducing flow back to the well has a number of advantages. For example, less flowback reduces the abrasive wear on expensive well equipment, reduces the cost of clean up, and ensures that more of the proppant stays in the pack, providing a longer useful life for the well and a better return on investment.

Although rod-shaped proppants may be used by themselves in a fracture, they may have additional utility when used in conjunction with another type of proppant, such as a spherical proppant. A mixture containing 10% of a rod-shaped proppant consistent with the present invention (having a diameter of between about 1.1 mm and 1.3 mm and length of about 10 mm to about 20 mm) and 90% of a spherical proppant (having a diameter of 0.7 mm) was tested according to API test 60 to determine the effect of the combination under pressure. At 15,000 psi, the rods were smaller but were still present in rod-shaped form (i.e., they cracked into smaller rod-shaped proppants rather than disintegrating into fines). Surprisingly, many of the rods remained relatively long, up to 15 to 17 mm.

In view of the above, sintered rods in accordance with the present invention possess a unique combination of properties that make them an excellent proppant or anti-flowback additive. Specifically, the high alumina content of the sintered rod ensures superior crush resistance, permeability, and conductivity at high closure pressures. Moreover, the proppant's unique shape enhances crush resistance, permeability, and conductivity by allowing even distribution of pressure throughout the proppant pack. In addition, the proppant's unique breaking behavior prevents deterioration of the pack and lowers the reduction in the pack's efficiency as compared to spherical proppants. The unique rod shape has the added benefit of reducing the non-Darcy flow effect in the well, thereby minimizing equipment wear and tear, maintaining consistent production of gas or oil, and reducing the cost involved in clean up of the flowback. When used in combination with other types of proppants, the presence of the rod-shaped proppant consistent with the present invention provides the unique advantages of increasing the void volume, decreasing proppant flowback, reducing the amount of fines generated at high pressures, and increasing the strength of intermediate and high strength proppants. Consequently, the rod-shaped material in accordance with the present invention may be used separately as a proppant, as a proppant in combination with other proppants, or as an anti-flowback additive when mixed in certain ratios with other proppants.

The preceding description is merely exemplary of various embodiments of the present invention. Those skilled in the art will recognize that various modifications may be made to the disclosed embodiments that would still be within the scope of the invention. For example, it is envisioned that sintered rod-shaped proppants or anti-flowback additives may contain an alumina content from about 40% to about 80% by weight, or may be formed using kaolin or bauxitic kaolin as a component, in addition to those listed above. The scope of the invention is intended to be limited only by the appended claims.

What is claimed is:

1. A method for making a proppant or antiflowback additive, the method comprising:
    mixing a ceramic precursor and at least one binding agent to form an extrudable mixture;
    extruding the extrudable mixture to form a plurality of extruded rods;
    reducing the length of the extruded rods by at least partially drying the rods in a manner that results in breakage of the extruded rods to form dried extruded rods of reduced length; and
    sintering the dried extruded rods of reduced length to obtain the proppant or antiflowback additive.

2. The method of claim 1, wherein the length of the extruded rods is not reduced by cutting.

3. The method of claim 1, further comprising fractionating the proppant or antiflowback additive to obtain a subset of rods having a desired range of lengths.

4. The method of claim 3, wherein the fractionating comprises sieving.

5. The method of claim 1, wherein the proppant or antiflowback additive has an average length to width ratio ranging from about 1.5:1 to about 7:1.

6. The method of claim 1, wherein the proppant or antiflowback additive has a packed void volume of greater than 40%.

7. The method of claim 1, wherein the proppant or antiflowback additive has a specific gravity ranging from 3.0 to 3.98 and a conductivity of greater than 3,000 mD-ft at 10,000 psi as measured under API Recommended Practice 61.

8. The method of claim 1, wherein said at least one binding agent is selected from the group consisting of methyl cellulose, polyvinyl butyrals, emulsified acrylates, polyvinyl alcohols, polyvinyl pyrrolidones, polyacrylics, starch, silicon binders, polyacrylates, silicates, polyethylene imine, lignosulfonates, and alginates.

9. The method of claim 1, further comprising adding at least one solvent during the mixing.

10. The method of claim 9, wherein the at least one solvent is selected from water, alcohols, ketones, aromatic compounds, and hydrocarbons.

11. The method of claim 1, wherein the ceramic precursor comprises at least 80% alumina and 0.15% to 3.5% $TiO_2$.

12. The method of claim 1, wherein the proppant or antiflowback additive comprises between about 0.2% by weight and about 4% by weight aluminum titanate.

13. The method of claim 1, wherein from about 7% by weight and about 13% by weight of the proppant or antiflowback additive is crushed at 15,000 psi.

14. The method of claim 1, wherein from about 9% by weight to about 19% by weight of the proppant or antiflowback additive is crushed at 15,000 psi.

15. The method of claim 1, wherein the extruded rods are sintered at a temperature ranging from about 1,300° C. to about 1,700° C.

16. The method of claim 1, wherein the extruded rods have an average length ranging from about 1 mm to about 5 mm.

17. The method of claim 1, wherein the extruded rods have an average length ranging from about 2 mm to about 4 mm.

18. The method of claim 1, further comprising coating the sintered rods with a coating agent selected from natural rubber, butyl rubber, polyurethane rubber, starches, petroleum pitch, tar, asphalt, organic semisolid silicon polymers such as dimethyl and methylphenyl silicones, polyhydrocarbons such as polyethylene, poplyproplylene, polyisobutylene, cellulose and nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, and mineral and petroleum waxes.

19. The method of claim 1, further comprising cutting or mechanically breaking the extruded rods to achieve a narrower length distribution.

* * * * *

UNITED STATES PATENT AND TRADEMARK OFFICE
CERTIFICATE OF CORRECTION

PATENT NO. : 8,562,900 B2  
APPLICATION NO. : 11/624057  
DATED : October 22, 2013  
INVENTOR(S) : Jean Andre Alary and Thomas Parias Page 1 of 1

It is certified that error appears in the above-identified patent and that said Letters Patent is hereby corrected as shown below:

Title page, item 75, line 1, "Lille" should read -- L'Isle --.

Signed and Sealed this  
Thirty-first Day of December, 2013

Margaret A. Focarino  
*Commissioner for Patents of the United States Patent and Trademark Office*